(12) United States Patent
Hashimura et al.

(10) Patent No.: US 8,801,884 B2
(45) Date of Patent: Aug. 12, 2014

(54) METHOD OF FORMING TIRE INNERLINER AND METHOD OF PRODUCING PNEUMATIC TIRE

(75) Inventors: Yoshiaki Hashimura, Hiratsuka (JP); Takahiko Sawada, Hiratsuka (JP); Norifumi Kameda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 693 days.

(21) Appl. No.: 12/439,770

(22) PCT Filed: Sep. 4, 2007

(86) PCT No.: PCT/JP2007/067162
§ 371 (c)(1),
(2), (4) Date: Mar. 3, 2009

(87) PCT Pub. No.: WO2008/029779
PCT Pub. Date: Mar. 13, 2008

(65) Prior Publication Data
US 2011/0000603 A1  Jan. 6, 2011

(30) Foreign Application Priority Data
Sep. 4, 2006 (JP) .................................. 2006-238895

(51) Int. Cl.
| | |
|---|---|
| *B29D 30/24* | (2006.01) |
| *B29D 30/30* | (2006.01) |
| *B29C 53/58* | (2006.01) |
| *B60C 5/14* | (2006.01) |
| *B29D 30/06* | (2006.01) |

(52) U.S. Cl.
CPC ............ *B60C 5/14* (2013.01); *B60C 2005/147* (2013.01); *B29D 30/3007* (2013.01); *B29D 30/24* (2013.01); *B29C 53/58* (2013.01); *B60C 2005/145* (2013.01); *B29D 2030/0682* (2013.01); *B29D 30/0681* (2013.01)
USPC .......................................... 156/117; 156/123

(58) Field of Classification Search
CPC ........... B29D 30/1607; B29D 30/1628; B29D 30/24; B29D 30/3028; B29D 2030/088; B29D 2030/0682; B29D 30/3007; B29D 30/0681; B60C 5/14; B29C 53/58
USPC .................................................. 156/117, 123
See application file for complete search history.

(56) References Cited

U.S. PATENT DOCUMENTS

| | | |
|---|---|---|
| 5,040,583 A | 8/1991 | Lin et al. |
| 5,156,921 A | 10/1992 | Lin et al. |
| 5,292,590 A | 3/1994 | Lin et al. |
| 5,992,486 A | 11/1999 | Katsuki et al. |
| 2005/0116374 A1* | 6/2005 | Ogawa et al. ................. 264/103 |
| 2006/0042740 A1* | 3/2006 | Takahashi et al. ............ 156/123 |

FOREIGN PATENT DOCUMENTS

| | | |
|---|---|---|
| JP | A 1-314164 | 12/1989 |
| JP | A 9-19987 | 1/1997 |

(Continued)

*Primary Examiner* — Yogendra Gupta
*Assistant Examiner* — John Blades
(74) *Attorney, Agent, or Firm* — Greer Burns & Crain, Ltd.

(57) ABSTRACT

A method of forming a tire innerliner having a cylindrical inner rubber layer and a cylindrical film formed of a thermoplastic resin or a thermoplastic elastomer composition having a thermoplastic resin and an elastomer blended therewith. The cylindrical film is disposed radially outwardly of the cylindrical inner rubber layer. The method includes the following steps: wrapping an unvulcanized rubber layer cylindrically around a building drum to form the cylindrical inner rubber layer; and subsequently wrapping a sheet-shaped film formed of a thermoplastic resin or a thermoplastic elastomer composition having a thermoplastic resin and an elastomer blended therewith cylindrically around the cylindrical inner rubber layer, which is already wrapped around the building drum, to form the cylindrical film. The unvulcanized rubber layer constituting the cylindrical inner rubber layer is a strip-shaped rubber layer, and the cylindrical inner rubber layer is formed by spirally winding the strip-shaped rubber layer.

7 Claims, 4 Drawing Sheets

(56) References Cited

FOREIGN PATENT DOCUMENTS

| JP | A 10-16509 | 1/1998 |
| JP | A 10-35232 | 2/1998 |
| JP | A 2002-18973 | 1/2002 |
| JP | A 2006-224854 | 8/2006 |
| JP | A 2007-296916 | 11/2007 |

* cited by examiner

METHOD OF FORMING TIRE INNERLINER AND METHOD OF PRODUCING PNEUMATIC TIRE

This application is a U.S. National Phase under 35 U.S.C. §371 of International Application No. PCT/JP2007/067162, filed Sep. 4, 2007.

TECHNICAL FIELD

The present invention relates to a method of forming a tire innerliner and a method of producing a pneumatic tire using the tire innerliner forming method, and more particularly, to a method of forming a tire innerliner and a method of producing a pneumatic tire capable of suppressing occurrence of an air pocket.

TECHNICAL BACKGROUND

There is known a pneumatic tire having an innerliner disposed facing the cavity of the tire as an air impermeable layer, the innerliner is formed of a film of a thermoplastic resin or a thermoplastic elastomer composition having a thermoplastic resin and an elastomer blended therewith instead of rubber in order to reduce the tire weight (see a patent document 1, for example).

A pneumatic tire having an innerliner formed of such a film employs a method including a step of forming an innerliner on an expandable and contractible building drum of a tire building machine by disposing a film preformed of a cylinder around the building drum (see a patent document 2, for example). Since the film is preliminarily formed as a cylinder, the film can be maintained on the expanded building drum using a contractive force of the film. Therefore, there is an advantage that complication of the structure of the tire building machine can be avoided.

More specifically, when a sheet-shaped film is used in the alternative of the cylinder film, a suction structure for suctioning and holding the sheet-shaped film that has been wrapped around the building drum is required. In order to securely hold the sheet-shaped film, it is necessary to provide a lot of suction openings in the entire outer circumferential surface of the building drum, suction passages communicating with the suction openings and the like, which makes the structure of the tire building drum complicated. However, when the cylinder film is used, the suction structure is not required.

When a structure which suctions and holds only the wrapping-starting end and wrapping-finishing end of the sheet-shaped film is employed in order to avoid complicating the structure of the tire building drum, ability for holding the film is significantly reduced. As a result, when another tire component is applied onto the film, the film moves easily, which produces a problem of significantly degrading accuracy of tire component application.

However, when the innerliner is formed on the building drum using the above cylinder film, the following problem is created. That is, a carcass ply is further applied onto the film via a rubber layer (a rubber layer for obtaining adhesion to the carcass ply). Since the building drum having an expandable and contractible construction comprises a plurality of drum pieces which are jointed together, depressions such as joint lines, screw holes and the like exist in the outer circumferential surface of the building drum on which the film is held. When the rubber layer has been applied onto the film, the film is partially depressed into the depressions because the film is thin, which creates a problem of being prone to form air pockets between the rubber layer and the film at locations of the depressions. If the air pockets are formed, trouble which occurs is that the inner surface of a tire is partially ballooned at locations of the air pockets after vulcanization.

Patent Document 1: Japanese Patent Application Kokai Publication HEI 10-35232
Patent Document 2: Japanese Patent Application Kokai Publication 2002-18973

DISCLOSURE OF THE INVENTION

Problems to be Solved by the Invention

An object of the present invention is to provide a method of forming a tire innerliner and a method of producing a pneumatic tire capable of suppressing occurrence of an air pocket and avoiding complicating the structure of a tire building machine.

Means for Solving the Problems

A method of forming a tire innerliner according to the present invention for achieving the above object is a method of forming a tire innerliner having a cylindrical inner rubber layer and a cylindrical film formed of a thermoplastic resin or a thermoplastic elastomer composition having a thermoplastic resin and an elastomer blended therewith, the cylindrical film being disposed radially outwardly of the cylindrical inner rubber layer, comprising the steps of: wrapping an unvulcanized rubber layer cylindrically around a building drum to form the cylindrical inner rubber layer; and wrapping a sheet-shaped film formed of a thermoplastic resin or a thermoplastic elastomer composition having a thermoplastic resin and an elastomer blended therewith cylindrically around the cylindrical inner rubber layer to form the cylindrical film.

A method of producing a pneumatic according to the present invention is a method of producing a pneumatic tire having an innerliner, the innerliner is formed according to the above method of forming a tire innerliner.

Effects of the Invention

According to the present invention mentioned above, the inner rubber layer formed on the building drum can cover depressions such as joint lines, screw holes and the like existing in the outer circumferential surface of the building drum. Therefore, during wrapping of the rubber layer around the thin film, the film is not depressed into the depressions. Accordingly, creation of air pockets between the film and the rubber layer at locations of the depressions can be prevented.

By wrapping the film around the inner rubber layer, the film is easily applied to the inner rubber layer. Therefore, it is not necessary to provide a suction structure for suctioning and holding the film with a tire building machine. Accordingly, when the sheet-shaped film is used, complication of the structure of the tire building machine having a building drum can be avoided.

When a film formed of a cylinder is used in the alternative of the sheet-shaped film, the cylinder film is held on the inner rubber layer by expanding the building drum to press the outer circumferential surface of the inner rubber layer against the inner circumferential surface of the film. In doing so, the outer circumferential surface of the inner rubber layer comes into contact with the inner circumferential surface of the cylinder film simultaneously with a large area. Therefore, it is difficult to produce a route for escaping air outside from between them, and an air pocket is apt to occur. However, the method of forming a tire innerliner according to the present invention employs a sheet-shaped film, and the sheet-shaped film is wrapped, whereby the sheet-shaped film can sequentially be brought into contact with the inner rubber layer. Therefore, occurrence of an air pocket produced when the cylinder film is used can be avoided between the inner rubber layer and the sheet-shaped film.

DESCRIPTION OF THE SYMBOLS

Figure 1A:
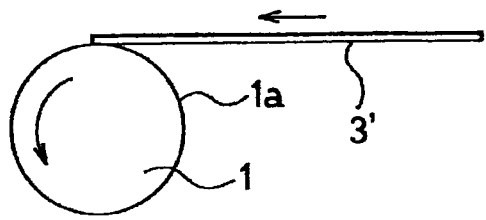
FIG. 1A is an explanatory drawing illustrating a step of wrapping a sheet-shaped unvulcanized rubber layer around a building drum in an embodiment of a method of forming a tire innerliner according to the present invention.

| 1 | building drum |
| 2 | tire innerliner |
| 3 | cylindrical inner rubber layer |
| 3' | unvulcanized rubber layer |
| 4 | cylindrical film |
| 4' | sheet-shaped film |
| 4'a, 4'b | longitudinal direction end |
| 5 | cylindrical outer rubber layer |
| 5' | unvulcanized rubber layer |
| 6 | adhesive layer |
| 7, 8 | strip-shaped rubber layer |
| 7a, 8a | end |

1 building drum
2 tire innerliner
3 cylindrical inner rubber layer
3' unvulcanized rubber layer
4 cylindrical film
4' sheet-shaped film
4'a, 4'b longitudinal direction end
5 cylindrical outer rubber layer
5' unvulcanized rubber layer
6 adhesive layer
7, 8 strip-shaped rubber layer
7a, 8a end

BEST MODES FOR CARRYING OUT THE INVENTION

Embodiments of the present invention will be described in detail below with reference to the attached drawings.

Figure 1B:
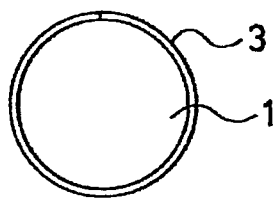
FIG. 1B is an explanatory drawing illustrating a cylindrical inner rubber layer formed on the building drum.
Figure 1C:
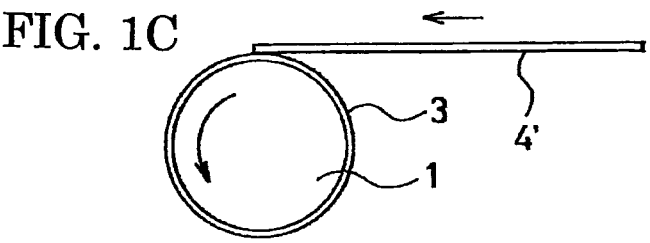
FIG. 1C is an explanatory drawing illustrating a step of wrapping a sheet-shaped film around the cylindrical inner rubber layer in the embodiment of a method of forming a tire innerliner according to the present invention.
Figure 1D:
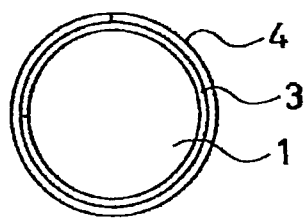
FIG. 1D is an explanatory drawing illustrating a cylindrical film formed on the inner rubber layer.
Figure 1E:
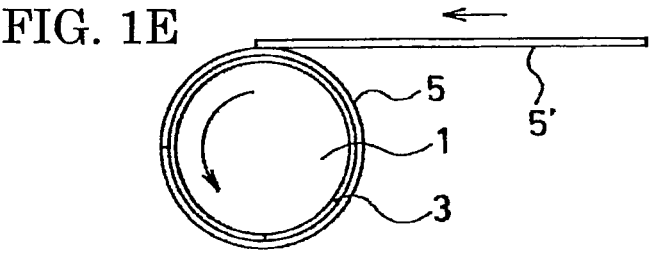
FIG. 1E is an explanatory drawing illustrating a step of wrapping a sheet-shaped unvulcanized rubber layer around the cylindrical film in the embodiment of a method of forming a tire innerliner according to the present invention.
Figure 1F:
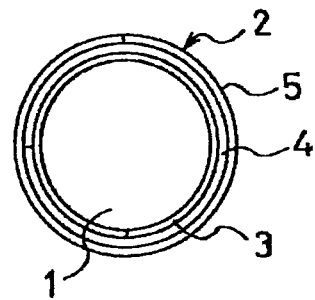
FIG. 1F is an explanatory drawing illustrating a cylindrical outer rubber layer formed on the cylindrical film.

Referring to FIGS. 1A to 1F, there is shown an embodiment of a method of forming a tire innerliner according to the present invention; reference numeral 1 denotes a building drum of a tire building machine. An innerliner 2 which is formed here and used for a pneumatic tire comprises, as shown in FIG. 1F, a cylindrical inner rubber layer 3, a cylindrical film 4 and a cylindrical outer rubber layer 5. The cylindrical film 4 is formed of a thermoplastic resin or a thermoplastic elastomer composition having a thermoplastic resin and an elastomer blended therewith. The cylindrical outer rubber layer 5 is disposed on the cylindrical inner rubber layer 3 via the cylindrical film 4.

The above tire innerliner 2 will be formed as shown below.

As shown in FIG. 1A, a sheet-shaped unvulcanized rubber layer 3' is fed to the building drum 1 rotating. The unvulcanized rubber layer 3' is cylindrically wrapped (applied) entirely around the building drum 1 to form a cylindrical inner rubber layer 3 on the tire building drum 1 as shown in FIG. 1B.

In an example shown in FIG. 1B, the cylindrical rubber layer 3 is formed by splicing the opposite edges of the unvulcanized rubber layer 3' in its longitudinal direction to each other in a butting manner. However, the cylindrical rubber layer 3 may be formed by splicing the opposite ends of the unvulcanized rubber layer 3' in its longitudinal direction to each other in an overlapping manner. As rubber used for the unvulcanized rubber layer 3', any of conventionally known rubbers may be used if it has good adhesion to the film 4. For example, diene rubbers, olefinic rubbers and the like are preferably used.

Next, as shown in FIG. 1C, a sheet-shaped film 4' formed of a thermoplastic resin or a thermoplastic elastomer composition having a thermoplastic resin and an elastomer blended therewith is fed to the building drum 1 rotating. The sheet-shaped film 4' is cylindrically wrapped (applied) entirely around the inner rubber layer 3 to form a cylindrical film 4 on the inner rubber layer 3 as shown in FIG. 1D.

As the thermoplastic resin and thermoplastic elastomer composition used for the sheet-shaped film 4', conventionally known ones (see Japanese Patent Application Kokai Publication HEI 10-35232, for example) may be used. Examples of the thermoplastic resin and the thermoplastic resin used for the thermoplastic elastomer composition may include polyamide resins, polyester resins, a resin formed of an ethylene-vinylalcohol copolymer and the like. As the elastomer of the thermoplastic elastomer composition, diene rubber or olefinic rubber can be mentioned.

Figure 2:
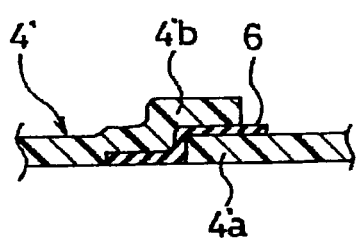
FIG. 2 is an enlarged partial cross-sectional view showing an example of the opposite longitudinal direction ends of the sheet-shaped film spliced to each other in an overlapping manner via an adhesive layer.

FIG. 1D shows an example of the cylindrical film 4 formed by splicing the opposite edges of the sheet-shaped film 4' in its longitudinal direction to each other in a butting manner. However, the cylindrical film 4 may be formed by splicing the opposite longitudinal direction ends of the sheet-shaped film 4' to each other in an overlapping manner. When the sheet-shaped film 4' is spliced in the overlapping manner, as shown in FIG. 2, the opposite longitudinal direction ends 4'a and 4'b of the sheet-shaped film 4' are preferably spliced to each other in an overlapping manner via an adhesive layer 6 of unvulcanized rubber, whereby the opposite longitudinal direction ends 4'a and 4'b of the sheet-shaped film 4' are tightly spliced to each other by the adhesive layer 6.

When the opposite longitudinal direction ends 4'a and 4'b of the sheet-shaped film 4' are spliced to each other via the adhesive layer 6, a sheet-shaped film 4' having the adhesive layer 6 preliminarily applied to one longitudinal direction ends 4'a is used. The sheet-shaped film 4' having the preliminarily applied adhesive layer 6 is wrapped entirely around the inner rubber layer 3, and the opposite longitudinal direction ends 4'a and 4'b of the sheet-shaped film 4' are spliced to each other in an overlapping manner via the adhesive layer 6. Alternatively, the opposite longitudinal direction ends 4'a and 4'b of the sheet-shaped film 4' may be spliced to each other via the adhesive layer 6 by applying the adhesive layer 6 to the one longitudinal direction ends 4'a of the sheet-shaped film 4' after applying the one longitudinal direction ends 4'a of the sheet-shaped film 4' onto the inner rubber layer 3 or after wrapping the sheet-shaped film 4' entirely around the inner rubber layer 3, and by splicing the other longitudinal direction end 4'b of the sheet-shaped film 4' onto the adhesive layer 6. As rubber used for the adhesive layer 6, the same rubber as one used for the unvulcanized rubber layer 3' is preferably used.

Next, as shown in FIG. 1E, a sheet-shaped unvulcanized rubber layer 5' is fed to the building drum 1 rotating. The unvulcanized rubber layer 5' is cylindrically wrapped (applied) entirely around the cylindrical film 4 to form a cylindrical outer rubber layer 5 on the film 4 as shown in FIG. 1F. Thus the cylindrical innerliner 2 having a structure of sandwiching the film 4 between the inner rubber layer 3 and the outer rubber layer 5 is formed on the building drum 1.

In FIG. 1F, the cylindrical outer rubber layer 5 is formed by splicing the opposite edges of the unvulcanized rubber layer 5' in its longitudinal direction to each other in a butting manner. However, like the unvulcanized rubber layer 3', the cylindrical outer rubber layer 5 may be formed by splicing the opposite longitudinal direction ends of the unvulcanized rubber layer 5' to each other in an overlapping manner. As rubber used for the unvulcanized rubber layer 5', the same rubber as one used for the unvulcanized rubber layer 3' can be used.

Figure 3:
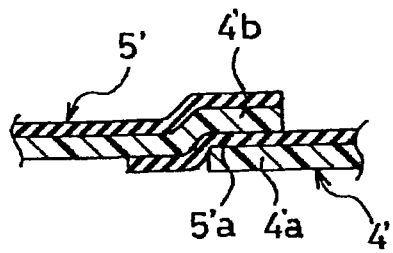
FIG. 3 is an enlarged partial cross-sectional view showing another example of the opposite longitudinal direction ends of the sheet-shaped film spliced to each other in an overlapping manner.

When the opposite longitudinal direction ends of the unvulcanized rubber layer 5' and the opposite longitudinal direction ends 4'a and 4'b of the sheet-shaped film 4' are spliced together in an overlapping manner, as shown in FIG. 3, they may be spliced such that one longitudinal direction ends 5'a of the unvulcanized rubber layer 5' is disposed between the opposite longitudinal direction ends 4'a and 4'b of the sheet-shaped film 4'.

According to the present invention described above, by forming the inner rubber layer 3 on the building drum 1, depressions such as joint lines, screw holes and the like existing in the outer circumferential surface 1a of the building drum 1 can be covered with the inner rubber layer 3. Therefore, during application of the unvulcanized rubber layer 5' onto the film 4, the film 4 is not depressed into the depressions even if the film 4 is thin, because the depressions are covered with the inner rubber layer 3. Accordingly, creation of air pockets between the film 4 and the outer rubber layer 5 at locations of the depressions can be prevented.

On the other hand, by wrapping the sheet-shaped film 4' around the inner rubber layer 3, the sheet-shaped film 4' is easily applied to the inner rubber layer 3. Therefore, it is not necessary to provide a suction structure for suctioning and holding the sheet-shaped film 4' with a tire building machine having the building drum 1. Accordingly, when the sheet-shaped film 4' is used, complication of the structure of the tire building machine can be avoided.

When a film formed of a cylinder is used in the alternative of the sheet-shaped film 4', the cylinder film is held on the inner rubber layer 3 by expanding the building drum to press the outer circumferential surface of the inner rubber layer 3 against the inner circumferential surface of the film. In doing so, the outer circumferential surface of the inner rubber layer 3 comes into contact with the inner circumferential surface of the film simultaneously with a large area. Therefore, it is difficult to create a route for escaping air outside from between the inner rubber layer 3 and the cylinder film, and an air pocket is apt to occur. However, the method of forming a tire innerliner according to the present invention employs the sheet-shaped film 4', and the sheet-shaped film 4' is wrapped, whereby the sheet-shaped film 4' can sequentially be brought into contact with the inner rubber layer 3. Therefore, occurrence of air pockets produced when the cylinder film is used can not be incurred between the inner rubber layer 3 and the cylindrically formed film 4.

Figure 4:
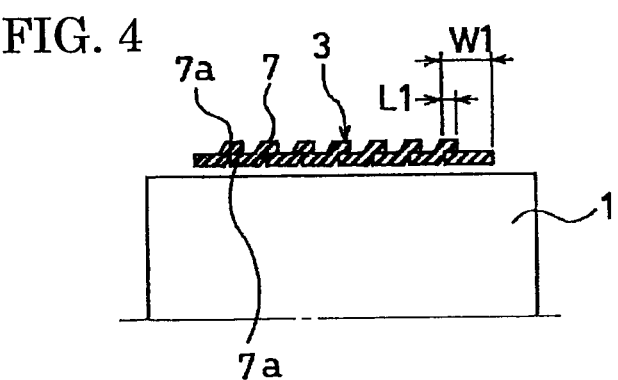
FIG. 4 is an explanatory drawing illustrating a step of forming an inner rubber layer in another embodiment of a method of forming a tire innerliner according to the present invention.

Referring to FIG. 4, there is shown a main part of another embodiment of a method of forming a tire innerliner according to the present invention. The method of forming a tire innerliner according to the present invention shown in FIG. 4 employs a strip-shaped rubber layer 7 with a narrow width as an unvulcanized rubber layer constituting the inner rubber layer 3. The strip-shaped rubber layer 7 is spirally wound around the building drum 1 rotating so as to partially overlap its adjacent ends 7a with each other to form the cylindrical inner rubber layer 3. The film 4 formed on the inner rubber layer 3 and the outer rubber layer 5 are formed in the same manner as the above.

Figure 5:
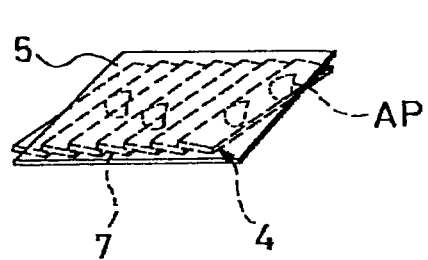
FIG. 5 is an explanatory drawing illustrating a state of trapped air.

As described above, when the inner rubber layer 3 is formed using the strip-shaped rubber layer 7, the same effects as the above can also be obtained. Further, by forming the inner rubber layer 3 with the strip-shaped rubber layer 7, as shown in FIG. 5, air pockets AP produced by air trapped between the inner rubber layer 3 and the film 4 are located within the width of the strip-shaped rubber layer 7. Therefore, there is an advantage that occurrence of large air pockets between the inner rubber layer 3 and the film 4 can be prevented.

In FIG. 4, the strip-shaped rubber layer 7 is drawn thicker in order to facilitate viewing the drawing for ease of understanding, and the outer circumferential surface of the inner rubber layer 3 formed of the strip-shaped rubber layer 7 that has been spirally wound is uneven. However, the outer circumferential surface of the inner rubber layer 3 actually just has a tiny step due to the overlapped ends of the strip-shaped rubber layer 7, and is substantially even. The inner rubber layers 3 shown in FIGS. 6, 7A and 7B described below are the same as the above.

Figure 6:
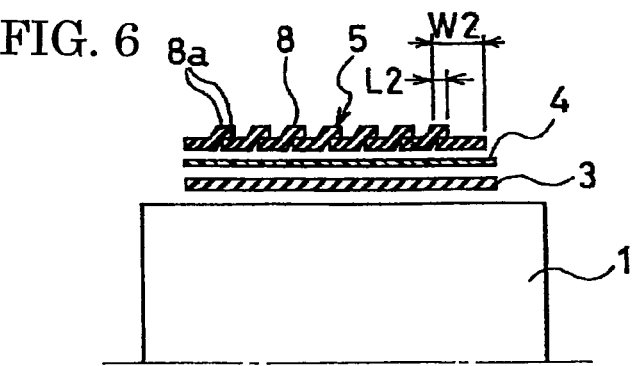
FIG. 6 is an explanatory drawing illustrating a step of forming an outer rubber layer in still another embodiment of a method of forming a tire innerliner according to the present invention.

Referring to FIG. 6, there is shown a main part of still another embodiment of a method of forming a tire innerliner according to the present invention. The method of forming a tire innerliner according to the present invention shown in FIG. 6 employs a strip-shaped rubber layer 8 with a narrow width as an unvulcanized rubber layer constituting the outer rubber layer 5. The strip-shaped rubber layer 8 is spirally wound around the film 4 rotating with the rotating building drum 1 so as to partially overlap its adjacent ends 8a with each other to form the cylindrical outer rubber layer 5. The inner rubber layer 3 and the film 4 other than the outer rubber layer 5 are formed in the same manner as shown in FIGS. 1A to 1E described above.

When the outer rubber layer 5 is formed using the strip-shaped rubber layer 8 as described above, the same effects as those of the embodiment shown in FIGS. 1A to 1E described above can also be obtained. Further, by forming the outer rubber layer 5 with the strip-shaped rubber layer 8, air pockets produced by air trapped between the film 4 and the outer rubber layer 5 are located within the width of the strip-shaped rubber layer 8. Therefore, there is an advantage that occurrence of large air pockets between the outer rubber layer 5 and the film 4 can be prevented.

Figure 7A:
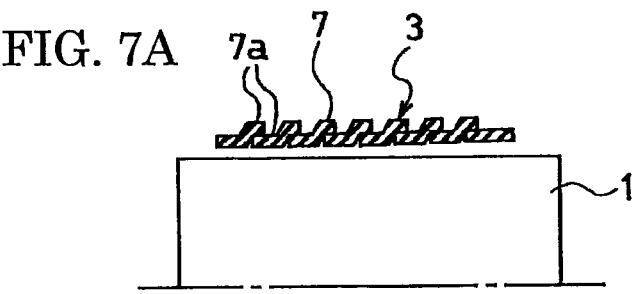
FIG. 7A is an explanatory drawing illustrating a step of forming an inner rubber layer in still another embodiment of a method of forming a tire innerliner according to the present invention.
Figure 7B:
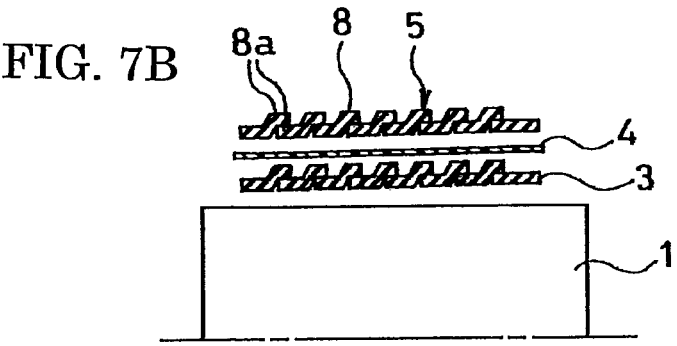
FIG. 7B is an explanatory drawing illustrating a step of forming an outer rubber layer in the still another embodiment of a method of forming a tire innerliner according to the present invention.

Referring to FIGS. 7A and 7B, there is shown a main part of still another embodiment of a method of forming a tire innerliner according to the present invention. The method of forming a tire innerliner according to the present invention shown in FIGS. 7A and 7B includes a step shown in FIG. 4 and a step shown in FIG. 6 described above.

More specifically, a strip-shaped rubber layer 7 with a narrow width is used as an unvulcanized rubber layer for the inner rubber layer 3. When the inner rubber layer 3 is formed, as shown in FIG. 7A, the strip-shaped rubber layer 7 is spirally wound around the building drum 1 rotating so as to partially overlap its adjacent ends 7a with each other to form the cylindrical inner rubber layer 3.

Also, a strip-shaped rubber layer 8 with a narrow width is used as an unvulcanized rubber layer for the outer rubber layer 5. When the outer rubber layer 5 is formed, as shown in FIG. 7B, the strip-shaped rubber layer 8 is spirally wound around the film 4 rotating with the rotating building drum 1 so as to partially overlap its adjacent ends 8a with each other to form the cylindrical outer rubber layer 5.

By forming both of the inner rubber layer 3 and the outer rubber layer 5 with the strip-shaped rubber layers 7 and 8 as described above, occurrence of large air pockets between the inner rubber layer 3 and the film 4, and between the film 4 and the outer rubber layer 5 can be prevented.

The widths W1 and W2 of the above strip-shaped rubber layers 7 and 8 are preferably in the range of 5 mm to 50 mm, respectively. If the width W1, W2 of the strip-shaped rubber layer 7, 8 is under 5 mm, a problem such that the strip-shaped rubber layer 7, 8 is cut off during winding because it is too thin, is apt to occur, and productivity is deteriorated because of an increase in time required for formation of the rubber layer 3, 5. If the width W1, W2 of the strip-shaped rubber layer 7, 8 is beyond 50 mm, the winding-starting part and winding-finishing part of the strip-shaped rubber layer 7, 8 spirally wound have larger portions which protrude from the film 4, and it is not preferable in terms of uniformity. If the strip-shaped rubber layer 7, 8 is wound in an overlapping manner in a winding-starting region and in a winding-finishing region to avoid protruding, waste of the overlapping portions is created.

Figure 8:
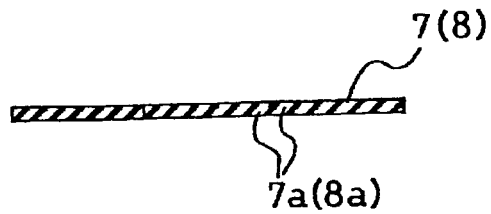
FIG. 8 is an enlarged partial cross-sectional view showing an example of a strip-shaped rubber layer wound with its adjacent opposite ends spliced to each other in a butting manner.

In the embodiments described above, the strip-shaped rubber layer 7, 8 is spirally wound so as to partially overlap the adjacent ends 7a, 8a with each other. However, as shown in FIG. 8, the strip-shaped rubber layer 7, 8 may be spirally wound so as to butt its adjacent ends 7a, 8a against each other. When the strip-shaped rubber layer 7, 8 is spirally wound so as to butt its adjacent ends 7a, 8a against each other or so as to partially overlap the adjacent ends 7a, 8a with each other, the ratio L1/W1, L2/W2 of the overlapping amount L1, L2 of the ends 7a, 8a to the width W1, W2 of the strip-shaped rubber layer 7, 8 is preferably in the range of 0 to 0.8. If the ratio L1/W1, L2/W2 exceeds 0.8, that is, the overlapping amount is greater, it is not preferable because an unnecessary increase in tire weight is incurred and the time for winding the strip-shaped rubber layer 7, 8 to form the rubber layer 3, 5 increases. The ratio L1/W1, L2/W2 is more preferably equal to or less than 0.5, even more preferably equal to or less than 0.2.

When the rubber layer 3, 5 is formed with the strip-shaped rubber layer 7, 8, it is preferable in terms of formation efficiency that one strip-shaped rubber layer 7, 8 be spirally wound to form the rubber layer 3, 5 as described above. However, a plurality of strip-shaped rubber layer 7, 8 may be used to form the rubber layer 3, 5.

There is no particular limitation to the cross-sectional shape of the strip-shaped rubber layer 7, 8 if the rubber layer 3, 5 can be formed without any trouble. Examples of the cross-sectional shape of the strip-shaped rubber layer 7, 8 can include parallelograms, rectangles, trapezoids, triangles and the like.

Figure 9A:
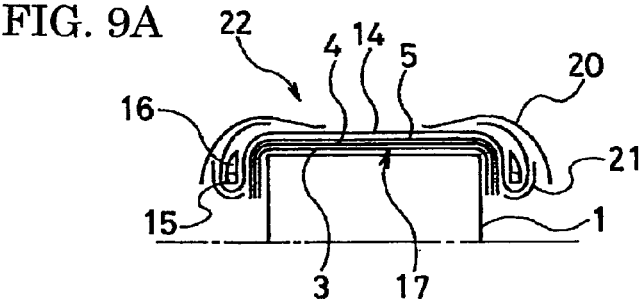
FIG. 9A is an explanatory drawing illustrating a step of forming a first assembly on a building drum in an embodiment of a method of producing a pneumatic tire according to the present invention.
Figure 9B:
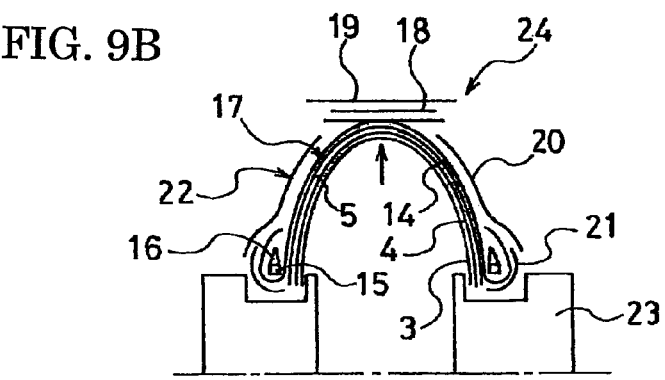
FIG. 9B is an explanatory drawing illustrating a step of inflating the first assembly to press it against a second assembly in the embodiment of a method of producing a pneumatic tire according to the present invention.
Figure 10:
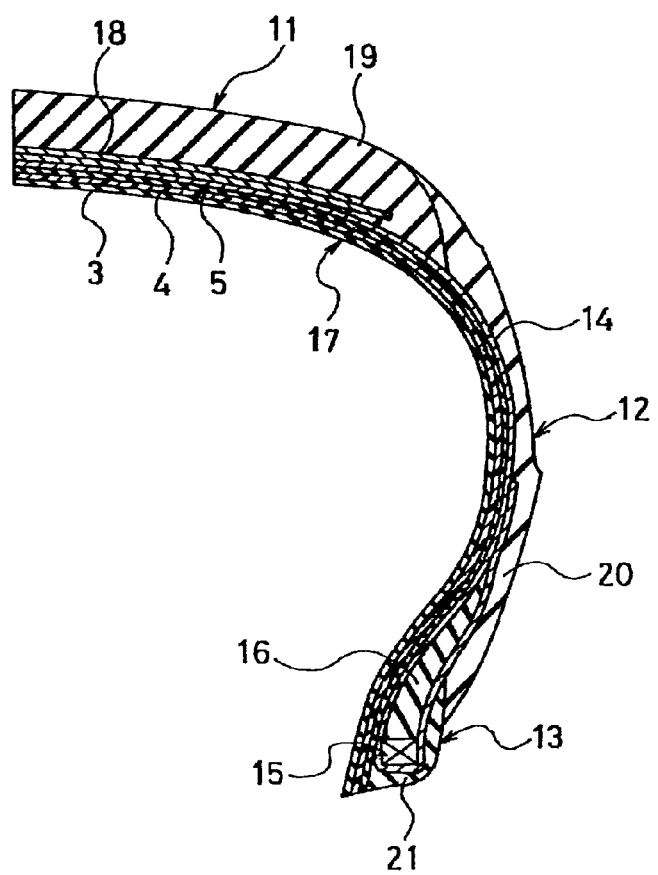
FIG. 10 is a partial cross-sectional view of a pneumatic tire produced by the method of producing a pneumatic tire according to the present invention shown in FIGS. 9A and 9B.

Referring to FIGS. 9A and 9B, there is shown an embodiment of a method of producing a pneumatic tire according to the present invention, using any one of the embodiments of the method of forming a tire innerliner described above. An example of a pneumatic tire produced according to the method indicated in FIGS. 9A and 9B is shown in FIG. 10. In FIG. 10, reference numeral 11 denotes a tread portion, reference numeral 12 denotes a sidewall portion, and reference numeral 13 denotes a bead portion.

The pneumatic tire of FIG. 10 has a carcass ply 14 extending between the left and right bead portions 13. The carcass ply 14 has a rubber layer and reinforcing cords extending in a radial direction of the tire. The reinforcing cords, that are disposed at prescribed intervals in a circumferential direction of the tire, are embedded in the rubber layer. The carcass ply 14 has opposite ends, which are turned up from an inner side in an axial direction of the tire toward an outer side in the tire axial direction around a bead core 15 embedded in each bead portion 13 so as sandwich a bead filler 16. An innerliner 17 is disposed inward of the carcass ply 14. The innerliner 17 is one obtained by vulcanizing the above-described tire innerliner 2, and comprises the inner rubber layer 3, film 4 and outer rubber layer 5, the film 4 being sandwiched between the inner rubber layer 3 and the outer rubber layer 5.

A plurality of belt plies 18 are provided radially outwardly of the carcass ply 14 in the tread portion 11. A tread rubber layer 19 is placed radially outwardly of the belt plies 18. A side rubber layer 20 is disposed outward of the carcass ply 14 in each sidewall portion 12. A cushion rubber layer 21 is provided in each bead portion 13.

The above pneumatic tire is produced as is conventionally done except that the an unvulcanized innerliner 17 (innerliner 2) is formed according to any one of the embodiments of the method of forming a tire innerliner described above. More specifically, An innerliner 2 comprising an inner rubber layer 3, film 4 and outer rubber layer 5 is formed on a building drum 1 according to the above-described forming method. Then, an unvulcanized carcass ply 14, bead cores 15 with unvulcanized bead fillers 16, unvulcanized cushion rubber layers 21, and unvulcanized side rubber layers 20 are attached as is conventionally done to form a first cylindrical assembly 22 (see FIG. 9A).

The first assembly 22 is removed from the building drum 1. As shown in FIG. 9B, the first assembly 22 is mounted on a shaping drum 23, and air pressure is applied to the first assembly 22 to thereby inflate the first assembly 22 in a toroidal shape. The inflated first assembly 22 is pressed against the inner circumferential surface of a second assembly 24 disposed radially outwardly of the first assembly 22 to build a green tire, the second assembly 24 having unvulcanized belt plies 18 and an unvulcanized tread rubber layer 19 stuck on the outer circumferential side thereof. The green tire is then vulcanized in a tire press to obtain a pneumatic tire shown in FIG. 10.

In the present invention, the thicknesses of the sheet-shaped unvulcanized rubber layer 3' and strip-shaped rubber layer 7 used for the rubber layer 3 are preferably in the range of 0.1 mm to 0.3 mm. If the thicknesses of the sheet-shaped unvulcanized rubber layer 3' and strip-shaped rubber layer 7 are less than 0.1 mm, they are so thin that the film 4 is apt to be depressed into the depressions in the building drum 1 with the inner rubber layer 3 during wrapping of the unvulcanized rubber layer 5' around the film 4. If the thicknesses of the sheet-shaped unvulcanized rubber layer 3' and strip-shaped rubber layer 7 are greater than 3.0 mm, it is not preferable because an increase in weight is incurred. Note that, when the cross-sectional shapes of the sheet-shaped unvulcanized rubber layer 3' and strip-shaped rubber layer 7 are triangles or the like, the thicknesses of the sheet-shaped unvulcanized rubber layer 3' and strip-shaped rubber layer 7 are mean thicknesses.

The thickness of the sheet-shaped film 4' is preferably in the range of 0.001 mm to 0.500 mm. If the thickness of the sheet-shaped film 4' is under 0.001 mm, there is a risk that the film 4' may be broken in the step shown in FIG. 9B. If the thickness of the sheet-shaped film 4' is beyond 0.500 mm, stress is focused on an area where the opposite longitudinal direction ends 4'a and 4'b of the sheet-shaped film 4' are spliced in an overlapping manner in the step shown in FIG. 9B, and breaking is apt to occur in the splice area.

An adhesive layer formed of an adhesive agent having good adhesion to the film 4' may provided on each side of the sheet-shaped film 4'. In such case, rubbers used for the inner rubber layer 3 and the outer rubber layer 5 may be ones having no good adhesion to the film 4'.

In the above embodiments, the innerliner 2 comprising the inner rubber layer 3, film 4 and outer rubber layer 5 has been explained. However, it may be one comprising an inner rubber layer 3 and a film 4. An innerliner having a structure including at least an inner rubber layer 3 and a film 4 disposed outward thereof suffices for the innerliner formed according to a method of forming a tire innerliner according to the present invention.

Example

Prepared were 50 test tires each having a construction shown in FIG. 10, the innerliner of which was formed in a manner that a sheet-shaped unvulcanized rubber layer with a thickness of 0.3 mm was wrapped around a building drum to form a cylindrical inner rubber layer, a sheet-shaped film with a thickness of 0.2 mm was wrapped around the inner rubber layer to form a cylindrical film, and then a sheet-shaped unvulcanized rubber layer with a thickness of 0.5 mm was wrapped around the cylindrical film to form a cylindrical outer rubber layer (present example 1).

Also, prepared were 50 test tires each having a construction shown in FIG. 10, the innerliner of which was formed in a manner that a sheet-shaped unvulcanized rubber layer with a thickness of 0.5 mm was wrapped around a building drum to form a cylindrical inner rubber layer, a sheet-shaped film with a thickness of 0.2 mm was wrapped around the inner rubber layer to form a cylindrical film, and then a strip-shaped rubber layer (a width W2 of 15 mm and a ratio L/W of 0.1) with a thickness of 0.5 mm and a cross-sectional shape of a rectangle was spirally wound around the cylindrical film to form a cylindrical outer rubber layer (present example 2). The width W2 of the strip-shaped rubber layer is 15 mm, and the ratio L2/W2 is 0.1.

Further, prepared were 50 test tires each having a construction shown in FIG. 10, the innerliner of which was formed in a manner that a sheet-shaped unvulcanized rubber layer with a thickness of 0.3 mm was wrapped around a building drum to form a cylindrical inner rubber layer, a sheet-shaped film with a thickness of 0.2 mm was wrapped around the inner rubber layer to form a cylindrical film, and then a strip-shaped rubber layer (a width W of 15 mm and a ratio L/W of 0.1) with a thickness of 0.5 mm and a cross-sectional shape of a rectangle was spirally wound around the cylindrical film to form a cylindrical outer rubber layer (present example 3). The width W2 of the strip-shaped rubber layer and the ratio L2/W2 are the same as in the present example 2.

Still further, prepared were 50 test tires each having the same construction as one shown in FIG. 10 except that there was no inner rubber layer, the innerliner of which was formed in a manner that a film of a cylinder with a thickness of 0.2 mm was directly disposed outward of a building drum and a sheet-shaped unvulcanized rubber layer with a thickness of 0.5 mm was wrapped around the cylindrical film to form a cylindrical outer rubber layer (comparative example 1).

Furthermore, prepared were 50 test tires each having the same construction as one shown in FIG. 10 except that there was no inner rubber layer, the innerliner of which was formed in a manner that a film of a cylinder with a thickness of 0.2 mm was directly disposed outward of a building drum and a strip-shaped rubber layer with a thickness of 0.5 mm and a cross-sectional shape of a rectangle was wound around the cylinder film to form a cylindrical outer rubber layer (comparative example 2). The width W2 of the strip-shaped rubber layer and the ratio L2/W2 are the same as in the present example 2.

The above test tires each have a size of 195/65R15. In each test tire, a thermoplastic elastomer composition having compounded materials shown in Table 1 was used for the film, and a rubber composition having compounded materials shown in Table 2 was used for each of the inner rubber layer and the outer rubber layer. The number of test tires of each group which created blister trouble that the inner surface of a tire was partially ballooned was checked, obtaining the results shown in Table 3.

TABLE 1

| Compounded Material | Compounding Ratio (parts by weight) | Product Name | Manufacturer |
|---|---|---|---|
| Nylon 11 | 24 | BESN O TL | Arkema K.K. |
| Nylon 6.66 | 16 | 5038B | Ube Industries Ltd. |
| BIMS | 60 | Exxpro MDX89-4 | ExxonMobil Chemical Company |
| Zinc Oxide | 0.3 | Zinc Oxide 3 | Seido Chemical Co. Ltd. |
| Stearic Acid | 1.2 | Bead Stearic Acid | Nippon OF Corporation |
| Zinc Stearate | 0.8 | Zinc Stearate | Seido Chemical Co. Ltd. |

TABLE 2

| Compounded Material | Compounding Ratio (parts by weight) | Product Name | Manufacturer |
|---|---|---|---|
| Natural Rubber | 50 | Natural Rubber TSR20 | NUSIRA Corporation |
| SBR | 50 | Nipol 1502 | Nippon Zeon Corporation |
| Carbon Black | 50 | Diablack G | Mitsubishi Chemical Corporation |
| Zinc Oxide | 3 | Zinc Oxide 3 | Seido Chemical Co. Ltd. |
| Stearic Acid | 2 | Bead Stearic Acid | Nippon OF Corporation |
| Oil | 10 | Extract 4S | Showa Shell Sekiyu K.K. |
| Wax | 1 | Sannokku | Ouchi Shinko Chemical Industry Co. Ltd. |
| Surfur | 2 | Oil-treated Sulfur | Hosoi Chemical Industry Co. Ltd. |
| Vulcanization Accelerator | 1 | Nokusera CZ-G | Ouchi Shinko Chemical Industry Co. Ltd. |
| Antioxidant | 1 | Nokusera 224 | Ouchi Shinko Chemical Industry Co. Ltd. |

TABLE 3

| | Comparative Example 1 | Comparative Example 2 | Present Example 1 | Present Example 2 | Presnet Example 3 |
|---|---|---|---|---|---|
| Inner Rubber Layer | Not exist | Not exist | Sheet-shaped unvulcanized rubber layer with a thickness of 0.1 mm | Sheet-shaped unvulcanized rubber layer with a thickness of 0.5 mm | Sheet-shaped unvulcanized rubber layer with a thickness of 3.0 mm |
| Film | Cylinder | Cylinder | Sheet | Sheet | Sheet |
| Outer Rubber Layer | Sheet-shaped unvulcanized rubber layer | Strip-shaped unvulcanized rubber layer | Sheet-shaped unvulcanized rubber layer | Strip-shaped unvulcanized rubber layer | Strip-shaped unvulcanized rubber layer |
| Number of Trouble Tire | 10 | 3 | 0 | 0 | 0 |

As seen from Table 3, the number of tires having blister trouble is 0 with respect to the pneumatic tires produced using the method of forming a tire innerliner according to the present invention, occurrence of an air pocket can be prevented when a film is used for the innerliner.

INDUSTRIAL APPLICABILITY

The present invention having the aforementioned excellent effects is applicable to pneumatic tires using a film formed of a thermoplastic resin or a thermoplastic elastomer composition having a thermoplastic resin and an elastomer blended therewith as an innerliner.

What is claimed is:

1. A method of forming a tire innerliner having a cylindrical inner rubber layer and a cylindrical film formed of a thermoplastic resin or a thermoplastic elastomer composition having a thermoplastic resin and an elastomer blended therewith, the cylindrical film being disposed radially outwardly of the cylindrical inner rubber layer, comprising the steps of:
   wrapping an unvulcanized rubber layer cylindrically around a building drum to form the cylindrical inner rubber layer; and
   subsequently wrapping a sheet-shaped film formed of a thermoplastic resin or a thermoplastic elastomer composition having a thermoplastic resin and an elastomer blended therewith cylindrically around the cylindrical inner rubber layer, which is already wrapped around the building drum, to form the cylindrical film,
   wherein the unvulcanized rubber layer constituting the cylindrical inner rubber layer is a strip-shaped rubber layer, the cylindrical inner rubber layer being formed by spirally winding the strip-shaped rubber layer,
   wherein the strip-shaped rubber layer is spirally wound so as to partially overlap adjacent ends thereof with each other or so as to butt the adjacent ends against each other, the strip-shaped rubber layer having a width $W1$ of 5 mm to 50 mm, a ratio of $L1/W1$ of an overlapping amount $L1$ of the adjacent ends to the width $W1$ of the strip-shaped rubber layer being in a range of 0 to 0.8,
   wherein the unvulcanized rubber layer constituting the cylindrical inner rubber layer has a mean thickness in a range of 0.1 mm to 3.0 mm,
   wherein the sheet-shaped film has a thickness of 0.001 mm to 0.500 mm.

2. The method of forming a tire innerliner according to claim 1, wherein the unvulcanized rubber layer constituting the cylindrical inner rubber layer is formed of a rubber selected from diene rubbers and olefinic rubbers.

3. The method of forming a tire innerliner according to claim 1, wherein tire innerliner further has a cylindrical outer rubber layer disposed radially outwardly of the cylindrical film, the method further comprising a step of wrapping an unvulcanized rubber layer cylindrically around the cylindrical film to form the cylindrical outer rubber layer.

4. The method of forming a tire innerliner according to claim 3, wherein the unvulcanized rubber layer constituting the cylindrical outer rubber layer is a strip-shaped rubber layer, the cylindrical outer rubber layer being formed by spirally winding the strip-shaped rubber layer.

5. The method of forming a tire innerliner according to claim 1, wherein the step of cylindrically wrapping the sheet-shaped film comprises splicing opposite longitudinal direction ends of the sheet-shaped film to each other in an overlapping manner via an adhesive layer formed of an unvulcanized rubber.

6. The method of forming a tire innerliner according to claim 5, wherein the unvulcanized rubber of the adhesive layer is selected from diene rubbers and olefinic rubbers.

7. A method of producing a pneumatic tire having an innerliner, the innerliner is formed according to a method of forming a tire innerliner according to claim 1.

* * * * *